(12) United States Patent
Achterholt

(10) Patent No.: US 7,834,747 B2
(45) Date of Patent: Nov. 16, 2010

(54) TIRE AIR PRESSURE MONITORING DEVICE AND METHOD FOR TIRE AIR PRESSURE MONITORING

(75) Inventor: Rainer Achterholt, Landschlacht (CH)

(73) Assignee: Global Dynamix AG, St. Moritz (CH)

( * ) Notice: Subject to any disclaimer, the term of this patent is extended or adjusted under 35 U.S.C. 154(b) by 549 days.

(21) Appl. No.: 11/813,945

(22) PCT Filed: Jan. 31, 2006

(86) PCT No.: PCT/EP2006/000823

§ 371 (c)(1),
(2), (4) Date: Jan. 24, 2008

(87) PCT Pub. No.: WO2006/082021

PCT Pub. Date: Aug. 10, 2006

(65) Prior Publication Data

US 2010/0039250 A1    Feb. 18, 2010

(30) Foreign Application Priority Data

Feb. 2, 2005   (DE) .................. 10 2005 004 833

(51) Int. Cl.
*B60C 23/00* (2006.01)

(52) U.S. Cl. .................. 340/447; 340/445; 73/146.5

(58) Field of Classification Search ......... 340/442–449, 340/425.5, 426.33, 10.6, 10.1; 73/146, 146.2, 73/146.3, 146.4, 146.5; 701/1, 2; 116/34 R
See application file for complete search history.

(56) References Cited

U.S. PATENT DOCUMENTS 5,774,048 A * 6/1998 Achterholt .................. 340/447
6,420,966 B2 * 7/2002 Sugisawa .................... 340/442
7,289,022 B2 * 10/2007 Ogawa et al. ............... 340/447
2002/0073771 A1   6/2002 Katou
2003/0076222 A1   4/2003 Fischer et al.
2003/0164758 A1   9/2003 King et al.

FOREIGN PATENT DOCUMENTS

| DE | 4205911  | 2/1993  |
| DE | 4303583  | 8/1994  |
| DE | 19608478 | 5/1997  |
| DE | 19856861 | 6/2000  |
| DE | 19921413 | 11/2000 |
| DE | 19939936 | 3/2001  |
| EP | 0760299  | 5/1997  |
| EP | 1452349  | 1/2004  |
| EP | 1003647  | 5/2005  |

OTHER PUBLICATIONS

European Search Report PCT/EP2006/000823 dated Jun. 4, 2006.

* cited by examiner

*Primary Examiner*—Anh V La
(74) *Attorney, Agent, or Firm*—Frost Brown Todd LLC

(57) ABSTRACT

In a tire air pressure monitoring device and/or in a method for performing tire air pressure monitoring by a device, each monitored pneumatic tire is provided with a wheel module, which generates radiotelegrams provided with air pressure data and sends them telemetrically to a control device in the vehicle. In addition, by an acceleration sensor serving as selection signal, a proportionate wheel position signal is generated in the wheel module and entered and stored in a data memory device on the wheel module. The control device generates a selecting demand signal that queries the presence or absence of the selection signal, which requires only the wheel modules that have or do not have the storage selection signal to send a radiotelegram within a stipulated time window or time frame. Thereupon, within the stipulated time window or time frame, only the radiotelegrams originating from the selected wheel module or the selected wheel modules are sent.

10 Claims, No Drawings

TIRE AIR PRESSURE MONITORING DEVICE AND METHOD FOR TIRE AIR PRESSURE MONITORING

BACKGROUND OF THE INVENTION

The present invention concerns the technical field of air pressure monitoring on pneumatic-tired vehicles. More in particular, the present invention concerns a tire air pressure monitoring device for a vehicle with several wheels, each of which are equipped with pneumatic tires, each monitored pneumatic tire being provided with a wheel module, which generates radiotelegrams containing air pressure data and sends them telemetrically to a control device on the vehicle. The invention also concerns a method for performing tire air pressure monitoring by means of such a tire air pressure monitoring device. In all cases, the invention is intended here preferably for use on vehicles with four wheels, i.e., especially for passenger cars, transporters, delivery trucks, pickups, light and medium trucks and buses.

Each monitored pneumatic tire is provided with a wheel module, which generates radiotelegrams that transmit a data set and transmits with a signal strength sufficient for telemetric transmission to a control device in the vehicle. It is not essential that all pneumatic tires be equipped with such a wheel module. However, if several pneumatic tires in different wheel positions are provided with such a wheel module, the control device must be able to assign a received radiotelegram to the wheel position in which a specific tire is situated, whose wheel module just sent this radiotelegram. The problem of assigning a radiotelegram to its wheel position, known in the technical world, is posed.

For this purpose, document DE 42 05 911 A1, already disclosed in 1993 a monitoring device for air pressure of pneumatic-tired vehicle wheels, which has a transmission device (or wheel module) on each vehicle wheel rotating with it. A receiving device (or control device) is also present, which is typically accommodated in the vehicle.

In particular, this document proposes that each wheel module has a signal generation device, which generates an identification signal that is characteristic for each wheel module and clearly identifies it. This identification signal can be generate in the form of an n-bit word (with n=8, 16, 24, 32 or more) and be stored in the area of the transmission device;

In particular, this document proposes that each wheel module has a signal generation device, which generates an identification signal that is characteristic for each wheel module and clearly identifies it. This identification signal can be generate in the form of an n-bit word (with n=8, 16, 24, 32 or more) and be stored in the area of the transmission device;

this identification signal is sent at least once before or after transmission of the useful signals as component of a radiotelegram of this wheel module;

the control device has at least one memory, in which an identification reference signal assigned to the corresponding individual wheel module is stored;

the control device has a comparison device, which checks whether the identification signal sent from the wheel module agrees with the identification reference signal stored in the control device; and further processing of the signals received by control device only occurs, if the identification signal received by the central unit (with the pressure data signal) and the identification reference signal stored in the central unit are identical.

This process corresponds to the working mode, during which the wheel modules generate radiotelegrams and send them telemetrically to a control device, where the useful signals contained in the radiotelegrams are evaluated, in order to display the tire air pressure occurring in each monitored pneumatic tire on a display and/or to trigger an alarm when the tire air pressure is incorrect.

In addition, during an initialization phase, a learning or assignment mode must be carried out, which places the control device in a position to assign a certain identification signal to a certain wheel position, in which the wheel module identified by this specific identification signal is situated; only after this assignment mode is conducted can the measured data signals connected to this identification signal be assigned to this wheel position. With the aforementioned cited document DE 42 05 911 A1, a special "pairing mode" is proposed for this purpose between the wheel module and the control device, which is triggered with an additional auxiliary device; for this purpose, it says there literally:

"In this practical example, an operating force with the activation device, which causes switching of the corresponding wheel module into the pairing mode, circulates from wheel to wheel and therefore switches the corresponding wheel into the pairing mode. By corresponding activation of a switch on the central unit or by maintaining a certain stipulated sequence, the radiotelegrams arriving in the central unit are then assigned to the individual wheel positions.

This type of activation can also be triggered by other events. A reed contact can be provided on the wheel module, which is activated from the outside by a magnet in the vicinity of the tire. It is also conceivable to provide a device to be operated mechanically on the tire valve shaft or tire valve foot, which is switched manually or operated by a manually produced lateral tilting movement of the valve".

To the extent such a device for tire air pressure monitoring operates with specific codes (identification signals, identification codes), each of which identifies the wheel module distinctly, in addition to the normal working mode, the assignment mode just described must also necessarily be performed, which places the control device in a position to assign a certain radiotelegram, by means of the identification signal contained in it, to a certain wheel position, from which this specific radiotelegram just originated.

The documents cited below disclose alternative proposals for performance of this assignment mode.

Document DE 196 08 478 A1 concerns a method for assignment of transmitters to receiving antennas in tire pressure monitoring systems. It is proposed here that a receiving antenna be mounted adjacent to each wheel on the vehicle body, for example, in the area of the wheel well, which is connected to the evaluation electronics of the control device. The method proposes the following process steps:

recording of the intensities of the signals originating from different transmitters received by the corresponding receiving antennas under their code;

comparison of the intensities of the signals with different code received by the same receiving antenna, so that several consecutively received signals are considered in the intensity comparison;

selection of the transmitter code with the greatest intensity on the receiving antenna and its assignment to this receiving antenna.

According to this method, all wheel modules and their radiotelegrams are evaluated simultaneously. This assignment mode requires a relatively long transmission phase, which does not insignificantly load the current memory on the wheel module. The reliability of this type of assignment is also not satisfactory.

Document DE 199 21 413 C1 concerns a method for carrying out assignment of tire pressure monitoring devices (or wheel modules) to wheel positions in a tire pressure monitoring system of a vehicle. Each wheel module sends its individual code at time spacings and a lengthened high-frequency signal to the central unit (or the control unit) of the tire pressure monitoring system. The high-frequency signals, because of the geometry of the wheel well and as a result of rotation of the wheel, have an individual trend dependent on the rotation angle of the wheel and on time. In the control device, a time is established from two consecutive high-frequency signals, at which the wheel, from which the signals were sent, assumes the same angular position. Between the two times, the corresponding wheel has made a whole number of revolutions. In the control device, the wheel position, in which the wheel has made a whole number of revolutions between the two times, is determined by means of the signals of the speed sensors. The corresponding wheel position is assigned to the individual code transmitted by the wheel module.

This is a typical example of many highly complex systems that are very demanding in production, installation and operation and have thus far not been implemented in practice.

Document EP 0 760 299 B1 concerns a device for tire filling pressure monitoring systems in vehicles. In order to simplify the learning mode for the evaluation device for wheel-related assignment of the sensor devices or to automate it, a device for tire filling pressure monitoring systems in vehicles with a sensor device on each wheel is proposed, which sends information to an evaluation device arranged in the vehicle. Each sensor device is equipped with a sensor to record the direction of rotation of the wheel assigned to it, which transmits the information on direction of rotation to the evaluation device. To record the direction of rotation, a roll switch is proposed; as an alternative, other sensors, for example, tangential or radial acceleration sensors, can be used for this purpose. The establishment of the direction of rotation or running direction of a wheel permits a statement as to whether the corresponding wheel is situated on the left side or right side of the vehicle, viewed in the direction of travel.

Document EP 1 003647 B1 concerns a method for assigning codes in signals of transmitters in a tire pressure monitoring system to the wheels, on which the transmitters are situated. It is proposed to supplement the wheel electronics present on each wheel, so that it measures not only the tire pressure and transmits it to the central receiving and evaluation electronics by means of a radiotelegram, also containing the specific code of this wheel electronics, but that:

on the monitored wheels, in addition to air pressure in the tire, a path acceleration resulting from the movement state of the corresponding wheel is measured, a path acceleration signal derived from it is sent, by means of the corresponding transmitter, to the receiving and evaluation electronics, and it is evaluated on information concerning the position of each wheel contained in the path acceleration signal, from which one the path acceleration signal is coming, during which to distinguish wheels on the right side of the vehicle from wheels on the left side of the vehicle, the sign of the path acceleration occurring on the wheel is already determined in an evaluation circuit provided on the wheel in the acceleration phase after starting of the vehicle.

As a result, it is proposed here to form on the rotating wheel already significant information concerning its wheel position, to transmit this wheel position information in wireless fashion to the control device, so that it is correlated there with the code (identification code) of this wheel module, so that in the later radiotelegrams of this wheel module, its tire pressure signals (via these specific identification codes) can be assigned to the present wheel position of this wheel module.

Finally, document DE 43 03 583 A1 already in 1994 disclosed a wheel module of this type, which has a data memory device, in which a pressure signal can be stored; RAM an EEPROM are mentioned as electronic memories. The wheel module described there can also contain an acceleration sensor, which is designed, for example, in the form of a piezoresistive converter with a Wheatstone bridge circuit.

Even more than ten years after UWATEC (=DE 42 05 911 A1), there is still no fully satisfactory system for executing the assignment mode. In particular, the vehicle industry requires systems that operate fully autonomously without any cooperation or activation by the vehicle driver. Consequently, there is also a demand for a simple, reliable and autonomously operating system for tire air pressure monitoring in vehicles, especially passenger cars.

The task of the present invention consists of furnishing a simple, reliable and autonomously operating system for tire air pressure monitoring in vehicles. The system should be particularly suited for passenger cars and comparable vehicles with four wheels.

To solve this task, the inventor mentioned here started from the following considerations and results of his own development work:

A: Even more than ten years after UWATEC (=DE 42 05 911 A1), the problem of the assignment mode is not satisfactorily solved. This problem is necessarily posed when a specific code or identification code is assigned to each wheel module. If necessary, the proposal of the wheel module identification code accepted thus far by the technical world does not lead to the objective.

B: The way proposed by BERU (=EP 1 003 647 B1), to form on the wheel module information concerning its wheel position with reference to the vehicle, to transmit this wheel position information by radiotelegram to the control device, in order to combine it there with the code of this wheel module and assign it, appears to be needlessly demanding. It was necessary to succeed in forming this wheel position information on the wheel module simply, stably and arbitrarily repeatably, so that this wheel position information can replace the wheel module code.

C: The four wheels of a typical vehicle (passenger car, etc.) already have a common wheel position criterion in pairs, namely, two wheels in the front axle position and two wheels in the rear axle position, or two wheels mounted on the left side and two wheels mounted on the right. It seems inappropriate to give up this already available proportionate wheel position assignment and treat all wheel modules equivalently, for example, during field intensity evaluation of their radiotelegrams, in order to then form this wheel position assignment again with significant expense.

D: The known signal intensity evaluation (cf. DE 196 08 478 A1 and many similar proposals) suffers from the fact that an attempt is made to record and assign all signal sources within a measurement period. According to the experiences of the inventor, more reliable results that are less prone to disturbance can be achieved with simpler means, if, in a first step, only two signal sources are evaluated and assigned, and, in a subsequent second step, the two other signal sources are evaluated and assigned. This also applies for recovering the wheel position information in other ways.

E: A bidirectional signal data communication between the wheel module and control device is already discussed in document DE 42 05 911 A1; cf. the statements from column 10, line 41 to column 11, line 14. However, these statements appear to be speculative, because the electronic components required for a wheel module on the rotating wheel were not available at that time. Wheel modules must be robust, long-lived and light, in order to keep the imbalance on the rotating wheel as low as possible. HF transmitting/receiving devices appropriate for wheel modules, so-called transceivers, according to knowledge of the inventor, have only become available in the last three to four hears. So-called application-specific circuits and chips (ASIC, generally based on CMOS technology) configured according to customer desires with an integrated pressure sensor, temperature sensor, uni- or multi-axial acceleration sensor, transceiver and signal intensity sensor in the form of an integrated internal RSSI circuit, have only just recently become available.

Since such chips, configured accordingly for customer requirements, are available, their versatile capabilities must also be used for tire air pressure monitoring. The rigid transmitting modes of the wheel modules during unidirectional signal data communication, which can no longer be influenced after first activation, can now be superseded by a flexible transmitted mode that reacts to requirements (instruction by demand), which opens up new surprising possibilities. By means of an intelligent, reciprocally tuned operating method of the control device and wheel modules, the current demand required for the receiving phases on the wheel modules can be kept low even during bidirectional signal data communication.

The present invention was developed based on the considerations presented above, research work and its results. This invention includes several aspects, as explained below.

A first aspect of the invention concerns a tire air pressure monitoring device for a vehicle with several wheels, which are equipped with pneumatic tires, comprising at least one wheel module for each monitored pneumatic tire, in which the wheel module has:

a pressure sensor, in order to generate an electric pressure signal corresponding to the pneumatic tire air pressure;

acceleration sensor, in order to record the direction of rotation of a rotating tire on the moving vehicle, and to form from it a selection signal corresponding to the corresponding vehicle side;

a signal data processing device with a data memory device, in which the signal data processing device processes signals produced in the wheel module, including the pressure signal, and generates a radiotelegram that has modulations corresponding to the signals produced in the wheel module; and an HF transmitting/receiving device coupled to the signal data processing device for telemetric signal data communication with a control device on the vehicle; and also comprising a control device mounted stationary on the vehicle, which is equipped with a data signal generation device and a data signal processing device, each supported by a microprocessor; and with an HF transmitting/receiving device with at least one assigned antenna, in order to generate demand signals, on the one hand, and transmit them telemetrically to the wheel modules, and in order to receive and evaluate the radiotelegrams generated by the wheel modules, on the other hand.

A peculiarity according to the invention consists of the fact that the selection signal generated by these acceleration sensors on the corresponding wheel modules is entered directly or in the form of a signal derived from it into its data memory device and stored, and kept ready for correlation with a demand signal of the control device;

the control device sends a selecting demand signal that queries the presence or absence of a selection signal, which requires only those wheel modules that have or do not have the storage selection signal to transmit a radiotelegram within a stipulated time window or time frame; and thereupon, within the stipulated time window or time frame, only the radiotelegrams originating from the selected wheel module or selected wheel modules are sent.

A second aspect of the present invention concerns a method for performing tire air pressure monitoring on a vehicle with several tires, each of which are equipped with pneumatic tires, in which each monitored pneumatic tire is provided with a wheel module, which has at least:

a pressure sensor, in order to generate an electric pressure signal corresponding to the pneumatic tire air pressure;

an acceleration sensor, in order to record the direction of rotation of a rotating wheel on the moving vehicle, and to form from it a selection signal corresponding to the corresponding vehicle side;

a signal data processing device with a data memory device, in which the signal data processing device processes signals occurring in the wheel module, including the pressure signal, and generates a radiotelegram, which has modulations corresponding to the signals occurring in the wheel module; and an HF transmitting/receiving device coupled to the signal data processing device for telemetric signal data communication with a control device on the vehicle; and also a control device mounted stationary on the vehicle is present, which is equipped with a data signal generation device and a data signal processing device, each supported with a microprocessor, and with an HF transmitting/receiving device with at least one assigned antenna, in order to generate demand signals, on the one hand, and transmit them telemetrically to the wheel modules, and to receive and evaluate the radiotelegrams generated by the wheel modules, on the other hand. A peculiarity according to the invention consists of the fact that the selection signal generated by these acceleration sensors on the corresponding wheel modules are entered directly or in the form of a signal derived from it into its data memory unit and stored and kept ready for correlation with a demand signal of the control unit;

the control unit sends a selecting demand signal that queries the presence or absence of the selection signal, requiring only the wheel modules that have or do not have the stored selection signal to send a radiotelegram within a stipulated time window or time frame; and thereupon, within the stipulated time window or time frame, only the radiotelegrams originating from the selected wheel module or selected wheel modules are sent.

Additional aspects of the present invention are apparent from the following description of preferred practical examples and the dependent claims.

Another aspect of the present invention concerns a tire air pressure monitoring device for a vehicle with several wheels, each of which is equipped with a pneumatic tire, in which each monitored pneumatic tire is provided with a wheel module, which has at least:

an integrated pressure sensor exposed to the pneumatic tire air pressure with measurement and control electronics, in order to generate an electric pressure signal;

an acceleration sensor with an adapted evaluation electronics, n order to record the direction of rotation of a rotating wheel on a moving vehicle and to form from it a selection signal corresponding to the corresponding vehicle side;

a signal data processing device provided with a data memory device, which processes signals occurring in the wheel module, including the pressure signal, and generates a radiotelegram, having modulations corresponding to these signals; and an HF transmitting/receiving device coupled to the signal data processing device for telemetric signal data communication with a control device on the vehicle; and also a control device mounted stationary on the vehicle is present, which is equipped with a data signal generation device and a data signal processing device, each supported by a microprocessor, as well as with an HF transmitting/receiving device with one or more assigned antennas, in order to generate demand signals, on the one hand, and send them telemetrically to the wheel modules, and to receive and evaluate the radiotelegrams generated by the wheel modules, on the other hand.

A peculiarity here consists of the fact that the selection signal generated by these acceleration sensors on the corresponding wheel modules are entered and stored directly or in the form of a signal derived from it in its data memory unit and kept ready for correlation with a demand signal of the control device;

the control device sends a selecting demand signal that queries the presence or absence of the selection signal, which requires only the wheel modules that have or do not have the stored selection signal to send a radiotelegram within a stipulated time window or time frame; and thereupon, within the stipulated time window or time frame, only the radiotelegrams originating from the selected wheel module or the selected wheel modules are sent.

Storage of a selection signal can occur in that only the storage places of a register provided for this purpose are acted upon with a voltage, i.e., set "high". If these specified storage places are not acted upon via voltage, they remain "low" or are set "low". As an alternative, these specified memory places can be occupied with either digital "1" or digital "0" or with another distinguishable criterion, for example, a data word consisting of a number of bits. For query and evaluation, it makes no difference whether the memory places being queried are set "high" or "low" or are occupied with a data set or not occupied. Consequently, the control device could also send a selection signal that queries the absence of the selection signal and therefore requires the corresponding wheel modules to send a radiotelegram.

Consequently, the comment "a selecting demand signal that queries the presence of a selection signal" below will also include the alternative, i.e., "a selecting demand signal that queries the absence of a selection signal", without this being stated in each individual case.

"Stipulated time window" means here that the selected wheel modules are required, after completion of the demand signal and after a waiting period specific for the wheel module(s) being selected to send the radiotelegram of the selected wheel module within a specified time interval. The specific waiting period is chosen, so that overlapping with sending of the radiotelegrams of the unselected wheel modules does not occur. "Stipulated time frame" means here that the demand signal requires the selected wheel module to send its radiotelegram within a specified sequence of timeslots. The beginning of this time frame and the intervals between timeslots are chosen, so that overlapping with sending of the radiotelegrams of the unselected wheel modules does not occur. In each case, it is guaranteed that only radiotelegrams of the selected wheel modules reach the control device within a specified time period known to the control device.

The wheel modules, after their first and optionally repeated activation, will send a notification radiotelegram to the control device. The control device then sends a notification confirmation signal to the wheel module. This notification confirmation signal can stipulate a time frame with timeslots for receipt of the demand signals. The duration of the receiving readiness of the wheel modules to receive the demand signals can be kept very short on this account, for example, restricted to a few milliseconds.

The tire air pressure monitoring device according to the invention is preferably prescribed for use in a vehicle having at least four wheels, in which, depending on the travel direction of the vehicle, two wheels are mounted on the left side of the vehicle and the other two wheels on the right side of the vehicle.

In this sense, another aspect of the present invention concerns a tire air pressure monitoring device for a vehicle with at least four wheels, in which, depending on the travel direction of the vehicle, two wheels are mounted on the left side of the vehicle and the other two wheels are mounted on the right side of the vehicle, and each wheel is equipped with a pneumatic tire, in which each monitored pneumatic tire is provided with a wheel module, having at least:

an integrated pressure sensor exposed to the pneumatic tire air pressure with measurement and control electronics, in order to generate an electric pressure signal;

an acceleration sensor with adapted evaluation electronics, in order to record the direction of rotation of the wheels on the moving vehicle, in order to form a first selection signal from it, which corresponds to the direction of rotation of the wheels mounted on the left side, and also in order to form a second selection signal that corresponds to the direction of rotation of the wheels mounted on the right side;

a signal data processing device provided with a data memory device, which processes signals occurring in the wheel module, including the pressure signal, and generates a radiotelegram, having modulations corresponding to these signals; and an HF transmitting/receiving device coupled to the signal data processing device for elemetric signal data communication with a control device on the vehicle; and also a control device mounted stationary on the vehicle is present, which is equipped with a data signal generation device and data signal processing device, each supported by a microprocessor, as well as with an HF transmitting/receiving device with one or more assigned antennas, in order to generate demand signals, on the one hand, and send them telemetrically to the wheel modules, and in order to receive and evaluate the radiotelegrams generated by the wheel modules, on the other.

A peculiarity here consists of the fact that the first selection signal generated by these acceleration sensors on every two wheel modules is stored, directly or in the form of a signal derived from it, in its data storage device (first wheel module); and the second selection signal generated by the two other wheel modules is stored, directly or in the form of a signal derived from it, in its data storage device (second wheel module);

the central unit sends a selecting demand signal that requires either the first wheel module or the second wheel module to send a radiotelegram within a stipulated time window or time frame; and thereupon, within the stipulated time window or time frame, only the radiotelegrams originating from the two selected wheel modules are sent.

If a spare tire with a wheel module is additionally present on this vehicle, after activation of the acceleration sensor, neither the first selection signal nor the second selection signal is stored in its data memory device. The control device can then send a selecting demand signal that requires those wheel modules that do not have either the first selection signal or the second selection signal to send a radiotelegram. In this way, the control device can receive and evaluate a radiotelegram with pressure data from the spare tire.

Another aspect of the present invention concerns a method for performing tire air pressure monitoring on a vehicle with several wheels, each of which is equipped with a pneumatic tire, in which each monitored pneumatic tire is provided with a wheel module, having at least:

an integrated pressures sensor exposed to the pneumatic tire air pressure with measurement and control electronics, in order to generate an electric pressure signal;

an acceleration sensor with adapted evaluation electronics, in order to record the direction of rotation of the rotating wheel on the moving vehicle, and to form from it a selection signal corresponding to the corresponding side of the vehicle;

a signal data processing device provided with a data memory device, which processes signals occurring in the wheel module, including the pressure signal, and generates a radiotelegram, having modulations corresponding to these signals; and an HF transmitting/receiving device coupled to the signal data processing device for telemetric signal data communication with a control device on the vehicle; and also a control device mounted stationary on the vehicle is present, which is equipped with a data signal generation device and a data signal processing device, each supported by a microprocessor, as well as with an HF transmitting/receiving device with one or more assigned antennas, in order to generate demand signals, on the one hand, and send them telemetrically to the wheel modules, and in order to receive and evaluate the radiotelegrams generated by the wheel modules, on the other.

A peculiarity here consists of the fact that the selection signal generated by these acceleration sensors on the corresponding wheel modules are entered and stored either directly or in the form for a signal derived from it in its data memory device and kept ready for correlation with a demand signal of the control device;

the control device sends a selecting demand signal that queries the presence or absence of the selection signal, requiring only those wheel modules, having or not having the stored selection signal, to send a radiotelegram within a stipulated time window or time frame; and thereupon, within the stipulated time window or time frame, only the radiotelegrams originating from the selected wheel module or the selected wheel modules are sent.

In this case as well, the method is prescribed preferably for application on a vehicle having at least four wheels, in which, depending on the travel direction of the vehicle, two wheels are mounted on the left and the other two wheels are mounted on the right. The acceleration sensors in the corresponding first wheel modules generate on the moving vehicle a first selection signal, and in the second wheel modules a second selection signal. The control devices sends a selecting demand signal, which requires either the first wheel modules or the second wheel modules to send a radiotelegram within a stipulated time window or time frame; and thereupon, within the stipulated time window or time frame, only the radiotelegrams originating from the two selected wheel modules are sent.

In this method as well, the tire air pressure in a spare time could be recorded and evaluated in the same way as described above for the tire air pressure monitoring devices.

The invention therefore makes possible a situation, in which, within a stipulated time window or time frame, only radiotelegrams of already pre-selected wheel modules reach the control device and/or its receiving antenna(s), for example, only radiotelegrams from the wheel module on the left front wheel and from the wheel module on the left rear wheel. By deliberate arrangement of the control device and/or its receiving antenna(s), for example, in the area of the vehicle longitudinal center plane and adjacent to a vehicle axle and distant from the other vehicle axle, a situation can be achieved, in which these radiotelegrams reach the control device with different signal intensity. Because of this signal intensity difference, the one radiotelegram can be assigned to one wheel module (for example, on the left front wheel) and the other radiotelegram to the other wheel module (for example, on the left rear wheel). Because only evaluation of the signal intensity difference in two radiotelegrams need by carried out from two different transmitting sources at a stipulated time, this evaluation can be conducted simply, quickly and reliably. For example, the signal intensity difference can be conducted with an internal RSSI circuit (received signal strength indicator), which is assigned to the HF transmitting/receiving device (or transceiver) on the control device.

Corresponding advantageous embodiments and modifications of the present invention are the object of dependent claims. "Tire air pressure monitoring" refers here both to the tire air pressure monitoring device according to the invention and to the method according to the invention for performing tire air pressure monitoring.

Thus, it can be preferably prescribed that two radiotelegrams with different signal intensity originating from the two selected wheel modules reach the antenna coupled to the control device and, by means of their signal intensity difference, are assigned to one selected wheel module or the other selected wheel module. In practice, the radiotelegram with the higher signal intensity is assigned to the wheel module adjacent to the control device and the radiotelegram with the lower signal intensity is assigned to the wheel module distant from the control device. Because the ratio of signal paths is at least 1:2 and only signals from two different signal sources are evaluated, this evaluation can occur quickly and reliably.

Preferably, an arrangement is provided for the control device and/or its (receiving) antenna in the area of the vehicle longitudinal center plane and adjacent to a vehicle axle, as well as distant from the other vehicle axle. Preferably, the control device and its (receiving) antenna should be no more than 40 cm distant from the vehicle longitudinal center plane and from the adjacent vehicle axle. Because of this, the largest possible distances to the wheel modules queried with the demand signals are achieved. The largest possible distance between the signal paths of the corresponding radiotelegrams is achieved.

The signal intensity of the radiotelegrams is preferably determined by means of an RSSI circuit (received signal strength indicator) and evaluated, which is assigned to the HF transmitting/receiving device or transceiver on the control device.

Radiotelegrams originating from the selected wheel modules contain air pressure data that are evaluated in the control device. In addition, these radiotelegrams can also contain data that form the basis of the corresponding selection signal, i.e., whether the radiotelegrams originate from wheel modules on wheels mounted on the left side or from wheel modules on wheels mounted on the right. After additional evaluation of the signal intensity of the radiotelegrams, the control device has all the required information, in order to be able to assign an entering radiotelegram to the wheel position of the transmitted wheel module. An additional use of a wheel module identification code is no longer required.

On the other hand, the present invention does not rule out the use of such wheel module identification codes. If the radiotelegrams originating from the selected wheel modules contain such identification codes, the signal intensity evaluation need not be conducted for each arriving radiotelegram, but it is sufficient, if this signal intensity evaluation is only conducted at larger time intervals. The radiotelegrams arriving within such an interval can then be assigned by means of their identification code.

Different details of the present invention are explained in detail below.

The wheel modules discussed here are described in a variety of forms in the prior art, for example, also in the documents mentioned in the introduction.

Pressure sensors, acceleration sensors, as well as data memory devices, for example, RAM or EEPROM, usable in such wheel modules, are described in document DE 43 03 583 A1, whose relevant disclosure to this extent is also explicitly made a component of the present document.

The wheel module is arranged in a clearly specified way within the space bounded by the pneumatic tire and rim, for example, fastened to the valve head, or fastened to the rim by means of a band or wire looping around the rim. The acceleration sensor is arranged within the wheel module, so that it can record the direction of wheel rotation. All wheels of a vehicle therefore have an identical structure. In a common axle position, for example, the front axle position, two identical wheels are arranged in mirror image fashion to each other. During forward travel of the vehicle, one wheel therefore rotates in a wheel forward direction of rotation and the other wheel, at the same time, in a wheel backward direction of rotation. These wheel directions of rotation correspond to the sign of the voltage generated by the acceleration sensor. Consequently, by means of the signal generated by the acceleration sensor, it can be recognized and evaluated whether a certain wheel is mounted on the left side of the vehicle or on the right side of the vehicle. This information and evaluation also forms the basis of the proposals in the documents EP 0 760 299 B1 and EP 1 003 647 B1, referred to in the introduction.

The pressure sensor and acceleration sensor can be integrated in a single chip. A tire pressure monitor SIP with motion sensor (SIP stands for system in a package), which is equipped with a pressure sensor based on a piezo-resistive Wheatstone bridge circuit, an acceleration sensor based on another piezo-resistive Wheatstone bridge circuit and a microcontroller, to which a low-power system interface is connected, available commercially, are particularly suited here. Various data memory devices, for example, RAM, EEPROM or ROM, can be connected to this interface. This sensor chip is preferably used in the wheel modules according to the invention.

The acceleration sensor just described produces an analog signal. It is preferably prescribed to feed this analog signal to an A/D converter and convert it to a 4-bit word. This 4-bit word can then be entered in the data memory device on the wheel module, stored there and kept ready for correlation with advance signal of the control device. It is possible, after each vehicle start, to form this 4-bit word again and therefore overwrite the stored value. On the other hand, it is advantageous to maintain the memory content for at least a certain stipulated time interval during a vehicle shutdown, so that this memory unit need not be formed again after each brief vehicle stop.

The HF transmitting/receiving device on the wheel module is typically a transceiver, which is designed for bidirectional signal data communication with the control device at the officially permitted frequencies for this of about 433, 868 or 915 MHz. Transmission of radiotelegrams and reception of signals of the control device occurs at the same frequency, so that either a transmitted phase or a receiving phase can occur within a stipulated time period. Both in the transmitting phase and in the receiving phase, noticeable current consumption occurs, for example, up to about 10 mA, so that the duration of this phase must be kept as short as possible, in order to guarantee the longest possible lifetime and readiness with the limited power of the battery on the wheel module. Typically, the duration for sending a radiotelegram or for receiving a demand signal is only a few milliseconds. For this purpose, synchronization of mutual signal exchange between the control device and wheel modules is essential. Outside of the transmitting or receiving phases, the transceiver and additional measurement and evaluation electronics on the wheel module are placed in an energy-saving state of readiness (sleep mode).

An event, for example, wheel revolution, or surpassing of a stipulated wheel revolution speed, or a change in wheel revolution speed, activates the transceiver on the wheel module. A report radiotelegram is sent, with which each wheel module ready for receipt reports to the control device. The control device then sends a report confirmation signal with the operating mode, i.e., which measurements are to be performed, for example, acceleration, pressure and temperature, and in which time intervals these measurements are to be performed, and whose results are to be sent by radiotelegram. For this transmission of radiotelegrams, a time frame with specified timeslots is assigned. In the period between these timeslots, the wheel modules enter the sleep mode, then measure and send the radiotelegram within the stipulated timeslots. After sending a stipulated number of radiotelegrams, the wheel module returns to the receiving mode, in order to receive a new operating mode signal.

In the context of the present invention, a selecting operating mode signal is generated, which causes the wheel modules to activate the acceleration sensor and to send the radiotelegrams, after a first time frame or after a second time frame, as a function of the sign of the formed voltage. For example, the selected wheel modules mounted on the left send their radiotelegrams during a first time frame and the unselected or wheel modules mounted on the right side send their radiotelegrams during a second (therefore not overlapping) time frame.

Correlation with the demand signal of the control device can consist of the fact that this demand signal contains a data packet that the wheel modules respond to on the left side of the vehicle or on the right side of the vehicle; for example, the corresponding demand signal can be the same 4-bit word stored in the data memory and on the wheel module. After receipt, entry and evaluation of this demand signal and establishment of agreement between the stored address (4-bit word from the acceleration sensor) and the requesting address, the wheel module will send a radiotelegram containing the pressure data, which additionally contains the vehicle sign signal, i.e., the 4-bit word mentioned here. In the control device, the signal intensity of this radiotelegram is evaluated and, based on high field intensity, is assigned to the front axle position or, based on low field intensity, to the rear axle position. The control device therefore has all the required wheel position information, in order to assign the radiotelegram to a specific wheel position, in which the transmitting wheel module is situated.

The HF transmitting/receiving device on the control device is typically a transceiver, to which an antenna is assigned, which serves for both transmitting and receiving purpose. An A/4 monopole antenna, which has a length of 8.5 cm at a typical frequency of 869 MHz and can easily be accommodated in the control device, is readily suited here. As an alternative, helix antennas or loop antennas can also be used. The control device is typically arranged roughly in the center over an axle, for example, over the front axle. In this case, the essentially same close distances to the two wheels in the front axle exist, as well as essentially the same far distances to the two wheels in the rear axle position. The different length of the signal transmission paths leads to distinct and evaluable differences in a corresponding signal intensity. For example, in such an arrangement for radiotelegrams from the front axle position, a signal intensity of about −80 dBm was measured, whereas the corresponding radiotelegrams from the rear axle position had a signal intensity of about −60 dBm to −65 dBm. By means of threshold value evaluation or the like, a distinction can clearly be made in this way between the signals from the front axle position, on the one hand, and the signals from the rear axle position, on the other. Because a distinction need only be made with such an arrangement between signals from two different signal sources within a stipulated time window at a single receiving location, this distinction can be made quickly and reliably.

Determination of the signal intensity difference can occur by means of ordinary field intensity sensors. It is preferably prescribed here that the transceiver on the control device be equipped with an internal RSSI circuit. Corresponding transceivers are commercially available. For example, the commercially available single chip very low power RF transceiver in 0.35 μm CMOS technology, which is preferably used in the context of the present invention, is well suited here. At a single frequency of 868 MHz, this RSSI circuit delivers a voltage between 1.2 and 0.1 volt for field intensities between about −100 dBm and −50 dBm, in which the voltage is inversely proportional to the field intensity of the input signal. By means of such an RSSI circuit, the field intensity differences occurring here can be reliably recorded, evaluated and assigned to the corresponding wheel positions.

The method for performance of tire air pressure monitoring according to the invention is explained below.

Activation of the acceleration sensor present in each wheel module will regularly and fully occur autonomously after an event, for example, after each vehicle start and/or after achieving a sufficient vehicle speed. The readiness for activation of the acceleration sensors designed as solid state converter structures is practically unlimited. The acceleration sensors so activated will form the selection signal decisive for their proportional wheel position and enter it in the data memory device provided on the wheel module, so that this selection signal is stored there and kept ready for correlation with a selecting demand signal of the control device. For this purpose, this first selection signal (i.e., wheel modules on the left side) can be stored directly in the wheel modules arranged on the left side and the selection signal complementary to it can be stored in the wheel modules on the right side, i.e., wheel modules on the right side or wheel modules on the left side (second selection signal).

According to a stipulated regime, the control device will require the wheel modules to send regular radiotelegrams at regular integrals with the modulations corresponding to the pressure signals. Within this regime, the control device will also send a selecting demand signal that queries the presence or absence of the selection signal, which only requires the wheel modules, having or not having the stored selection signal, to send the radiotelegram within a stipulated time window or time frame. For example, the selecting demand signal can contain the first selection signal and with this demand signal, the two wheel modules situated on the left side of the vehicle can be required to send the radiotelegram.

Thereupon, only the selected wheel modules, i.e., in this example, the wheel modules situated in the left front axle position and the wheel modules situated in the left rear axle position, will send the radiotelegram within a stipulated time limit or time frame. This radiotelegram can contain the proportional wheel information. As an alternative, the control device can prescribe the freely switched time window only for radiotelegrams from these proportional wheel positions. In each case, the control device contains information that these radiotelegrams originate from wheel modules on the left side.

These two wheel modules have a different distance to the receiving antenna on the control device, so that the radiotelegrams are received on the control device with different signal intensity and are assigned there to one wheel module or the other wheel module by means of their signal intensity difference. For example, the radiotelegram with high field intensity is assigned to the front axle position and the radiotelegram with low field intensity to the rear axle position. In this way, the control device can clearly assign each received radiotelegram to a specific wheel position. In this variant, a signal intensity evaluation must be conducted on each received radiotelegram.

By means of a selecting demand signal, which requires such a wheel module to send a radiotelegram, which either has the first selection signal or the second selection signal, a spare tire in the vehicle can also be recorded and its tire air pressure evaluated.

According to an alternative variant, it can be prescribed that radiotelegrams evaluated with respect to their wheel position can additionally contain an identification signal characteristic for the corresponding wheel module. After the origin of a certain radiotelegram from a certain wheel position has been determined by means of the aforementioned measures, the identification signal of this radiotelegram can then be assigned to this specific wheel position.

It is sufficient, if this assignment of the radiotelegram and the identification signal to a certain wheel position is conducted only at larger intervals, for example, after receiving a stipulated number of radiotelegrams and/or after each starting of the vehicle motor and/or after a stipulated number of vehicle starts has occurred and the like. Assignment of the wheel position and wheel module identification code can also occur fully autonomously.

Within these limits, radiotelegrams, each containing an identification signal, can be received and evaluated. These radiotelegrams are assigned in the usual manner by means of the correlation of identification signal and wheel position present on the control device to the specific wheel position, in which the wheel module identified with this identification signal is situated, and from which this radiotelegram originates.

This procedure can be expedient, if the wheel module, in addition, sends radiotelegrams without requirement by the control device according to its own regime, for example, when a high-pressure drop suddenly occurs on the affected pneumatic tire, which requires immediate warning.

What is claimed is:

1. Tire air pressure monitoring device for a vehicle with several wheels, each of which is equipped with pneumatic tires, comprising (a) at least one wheel module for each monitored pneumatic tire, in which the wheel module compromises:

a pressure sensor, in order to generate an electric pressure signal corresponding to the pneumatic tire air pressure;

an acceleration sensor, in order to record the direction of rotation of a rotating wheel on the moving vehicle and to form from it a selection signal corresponding to the vehicle side;

a signal data processing device with a data storage device, in which the signal data processing device processes signals formed in the wheel module, including the pressure signal, and generates a radiotelegram, having modulations corresponding to the signals occurring in the wheel module; and an HF transmitting/receiving device coupled to the signal data processing device for telemetric signal data communication with a control device on the vehicle; and (b) the control device mounted stationary on the vehicle, which is equipped with a data signal generation device and a data signal processing device, each supported with a microprocessor, as well as with an HF transmitting/receiving device with at least one assigned antenna, in order to generate demand signals, and send them telemetrically to the wheel modules, and to receive and evaluate the radiotelegrams generated by the wheel modules;

wherein the selection signal generated by these acceleration signals on the corresponding wheel modules is entered and stored, directly or in the form of a signal derived from it, in its data storage device and kept ready for correlation with a demand signal of the control device;

the control device sends a selecting demand signal that queries the presence or absence of the selection signal, which requires only the wheel modules that have or do not have the stored selection signal to send a radiotelegram within a stipulated time window or time frame; and thereupon, within the stipulated time window or time frame, only the radiotelegrams originating from the selected wheel module or the selected wheel modules are sent.

2. Tire air pressure monitoring device according to claim 1, comprising at least four wheel modules for a vehicle with at least four wheels, in which, depending on the direction of travel of the vehicle, at least two wheels are mounted on the left side of the vehicle and the two other wheels are mounted on the right side of the vehicle, and the acceleration sensor forms a first selection signal, which corresponds to the direction of rotation of the wheels mounted on the left side and forms a second selection signal, which corresponds to the direction of rotation of the wheels mounted on the right side;

and in which:

the first selection signal generated by these acceleration sensors on two wheel modules is stored, directly or in the form of a signal derived from it, in its data storage memory device (first wheel module); and the second selection signal generated in the two other wheel modules is stored, directly or in the form of a signal derived from it, in its data memory device (second wheel module);

the control device sends a selecting demand signal, which requires either the first wheel module or the second wheel module to send a radiotelegram within a stipulated time window or time frame; and thereupon, within the stipulated time window or time frame, only the radiotelegrams originating from the two selected wheel modules are sent.

3. Tire air pressure monitoring device according to the claim 1, in which the control device and/or its antenna(s) is arranged in the region of the vehicle longitudinal center plane and adjacent to a vehicle axle, as well as distant from the other vehicle axle.

4. Tire air pressure monitoring device according to claim 1, in which the HF transmitting/receiving device on the control device is a transceiver; this receiver is provided with an internal RSSI circuit.

5. Tire air pressure monitoring device according to claim 1, in which the pressure sensor has measurement and evaluation electronics.

6. Tire air pressure monitoring device according to claim 1, in which the acceleration sensor has adjusted evaluation electronics.

7. Method for performance of tire air pressure monitoring on a vehicle with several tires, each of which is equipped with pneumatic tires, in which each monitored pneumatic tire is provided with
(a) a wheel module, comprising:
a pressure sensor, in order to generate an electric pressure signal corresponding to the pneumatic tire air pressure;

an acceleration sensor, in order to record the direction of rotation of a rotating wheel on the moving vehicle, and to form from it a selection signal corresponding to the corresponding side of the vehicle;

a signal data processing device with a data memory device, in which the signal data processing device processes signals occurring in the wheel module, including the pressure signal, and generates a radiotelegram, having modulations corresponding to the signals formed in the wheel module; and an HF transmitting/receiving device coupled to the signal data processing device for telemetric signal data communication with a control device on the vehicle; and (b) the control device mounted stationary on the vehicle is present, which is equipped with a data signal generation device and a data signal processing device, each supported with a microprocessor, as well as with an HF transmitting/receiving device with at least one assigned antenna, in order to generate demand signals and transmit them telemetrically to the wheel modules, on the one hand, and to receive and evaluate the radiotelegrams generated by the wheel modules, on the other;

wherein the selection signal generated by these acceleration sensors on the corresponding wheel modules are entered and stored, directly or in the form of a signal derived from them, in its data memory device and kept ready for correlation with a demand signal of the control device;

the control device sends a selecting demand signal that queries the presence or absence of the selection signal, which requires only the wheel modules that have or do not have the stored selection signal to send a radiotelegram within a stipulated time window or time frame; and thereupon, within the stipulated time window or time frame, only the radiotelegrams originating from the selected wheel module or the selected wheel modules are sent.

8. Method for performance of the tire air pressure monitoring according to claim 7 on a vehicle with at least four wheels, in which, depending on the direction of travel of the vehicle, at least two wheels are mounted on the left side of the vehicle and the other wheels are mounted on the right side of the vehicle, and the acceleration sensor forms a first selection signal, which corresponds to the direction of rotation of the wheels mounted on the left side, and a second selection signal, which corresponds to the direction of rotation of the wheels mounted on the right side; and in which:

- the first selection signal generated by these acceleration sensors on the two wheel modules are stored, directly or in the form of a signal derived from them, in the data memory device (first wheel module); and
- the second selection signal generated by the two other wheel modules is stored, directly or in the form of a signal derived from it, in its data memory device (second wheel module);
- the control device sends a selecting demand signal that requires either the first wheel module or the seconds wheel module to send a radiotelegram within a stipulated time window or time frame; and
- thereupon, within the stipulated time window or time frame, only the radiotelegrams originating from the two selected wheel modules are sent.

9. Method for tire air pressure monitoring according to claim 7, in which two of the radiotelegrams originating from the two selected wheel modules arrive at the antenna coupled to the control device with different signal intensities; and by means of their signal intensity difference, they are assigned to one selected wheel module or the other selected wheel module.

10. Method for tire air pressure monitoring according to claim 7, in which the radiotelegrams sent by the selected wheel modules, after receipt of the selecting demand signal, also have modulation corresponding to the corresponding selection signal.

* * * * *